April 30, 1929.　　　　J. KELSO　　　　1,710,878

FLOWERPOT CONSTRUCTION

Filed Sept. 17, 1927

Inventor

Joseph Kelso

By Clarence A. O'Brien
Attorney

Patented Apr. 30, 1929.

1,710,878

UNITED STATES PATENT OFFICE.

JOSEPH KELSO, OF BELLEVUE, IOWA.

FLOWERPOT CONSTRUCTION.

Application filed September 17, 1927. Serial No. 220,214.

My invention relates to improvements in flower pot constructions, and the same pertains more particularly to the base structure of flower pots, wherein is formed a plurality of drain openings and means readily allowing the water to drain from under the base of the pot.

The purpose of this invention is to provide a novel base construction for flower pots for allowing a more effective drainage thereof.

Heretofore, the majority of flower pots have been formed with but a single draining opening in the bottom thereof which frequently becomes obstructed, and the proper drainage of the pot deterred.

In this condition, certain delicate flowers and plants will not survive, and it has been the effort of florists of the country for some length of time to secure a flower pot wherein the plurality of drain openings are formed.

In my accompanying application, on base formers for flower pots, filed on or about the same date as this application, I have provided novel means for producing this novel desired result.

It is a well known fact that over-watering of flowers growing in flower pots where the drainage thereof is defective, is just as injurious to the plant as an insufficient supply of water.

In addition to the fact that the majority of flower pots now on the market are formed with but a single drain opening, it will also be noted that when these flower pots are set upon their flat bottoms upon a hard surface through which the water will not percolate, the drainage becomes just as obstructive as if the construction had taken place within the pot.

An object of my invention is to provide a flower pot with the novel base wherein the same is provided with a plurality of drain openings and means for allowing the proper escape of the drained water from under the base of the flower pot.

Another object resides in the forming of the flower pot with a base rib having nitches therein to allow the escape of water draining from the flower pot.

Other objects and advantages will become apparent as my invention is better understood from the specification and claim to follow.

In the drawing:—

Figure 1:
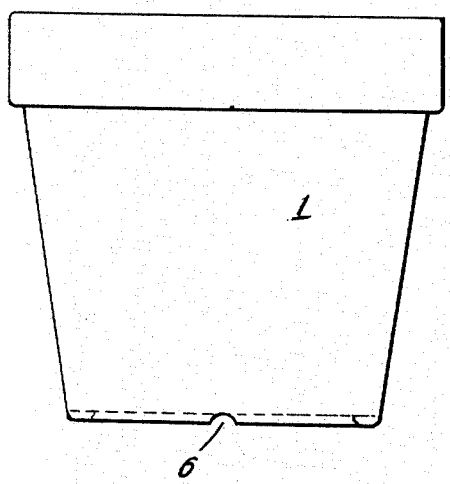
Figure 1 is a side elevation of my improved flower pot showing a nitch in the bottom rib indicated partly thereon by dotted lines.
Figure 2:
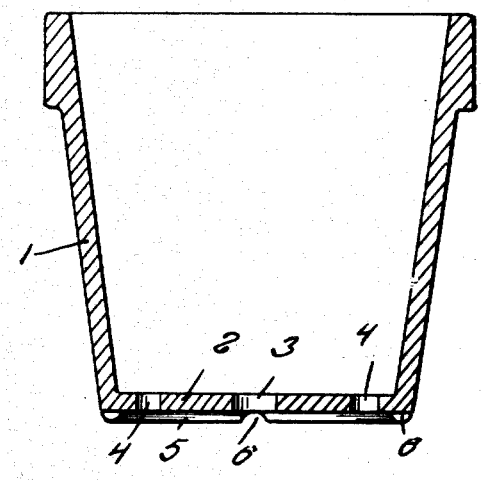
Fig. 2 is a cross sectional view through the improved flower pot showing the annular rib, and the plurality of drain openings in the base of the flower pot.
Figure 3:
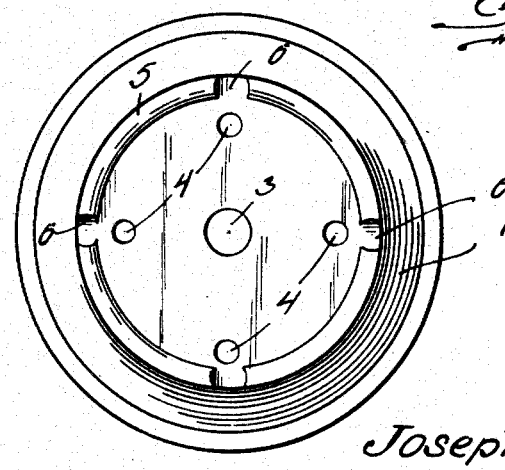
Fig. 3 is a bottom plan view of the flower pot showing the base thereof formed with the various drain facilities.

For a more detailed explanation of my flower pot construction, I now refer to the drawings in which like numerals designate like parts. The usual flower pot body 1 is provided with a bottom 2 in which is formed an enlarged opening 3 centrally located. Readily disposed from this enlarged opening 3 are a plurality of smaller openings 4, thus allowing additional openings for the drainage of water from the flower pot interior.

At the edge of the bottom surface of the bottom 2 is formed an annular rib 4 having formed therein a plurality of nitches 6 located substantially adjacent the openings 4.

Suppose that earth is contained in the pot 1, and a plant is growing therein, water is poured into the pot to supply the plant. Now as this water percolates through the earth and into the pot, the intent is that the water drains down through the openings 3 and 4 and into the space immediately under the bottom of the pot. Here the water will not accumulate due to the fact that the rib formed around the edge of the bottom of the flower pot for elevating same from the ground, is formed with a plurality of nitches 6 preferably immediately adjacent the opening 4 and through which the water will further freely drain.

Having thus described my invention, what I claim as new is:—

In a flower pot construction provided with the usual closed bottom, an annular supporting rib formed on the bottom of said pot, said rib being formed with circumferentially extending nitches; the bottom of said pot being formed with a drain opening adjacent to its edge and immediately inwardly from each nitch of the rib to allow the direct escape of water drained from the pot.

In testimony whereof I affix my signature.

JOSEPH KELSO.